US005546146A

United States Patent [19]
Dobbs et al.

[11] Patent Number: 5,546,146
[45] Date of Patent: Aug. 13, 1996

[54] SINGLE USE CAMERA FILM PRE-EXPOSURE METHOD

[75] Inventors: Gregg T. Dobbs; Loura L. Dobbs, both of Windemere; John M. Dobbs, Winter Garden, all of Fla.

[73] Assignee: Keepsake, Inc., Windermere, Fla.

[21] Appl. No.: 229,689

[22] Filed: Apr. 19, 1994

[51] Int. Cl.[6] .............................. G03B 1/00; G03B 27/52
[52] U.S. Cl. ............................ 354/120; 355/40; 355/77
[58] Field of Search ........................... 355/39, 40, 79; 354/106, 107, 108, 109, 110, 120, 125, 295

[56] References Cited

U.S. PATENT DOCUMENTS

| | | |
|---|---|---|
| 360,314 | 3/1887 | Lewis . |
| 547,855 | 10/1895 | Lee . |
| 1,268,609 | 6/1918 | Powell . |
| 3,665,828 | 5/1972 | Reiter . |
| 3,815,147 | 6/1974 | Wick . |
| 3,928,863 | 12/1975 | Stewart et al. . |
| 4,268,144 | 5/1981 | Wheeler . |
| 4,310,232 | 1/1982 | Reed . |
| 4,352,555 | 10/1982 | Dobbs et al. . |
| 4,427,279 | 1/1984 | Edelstein et al. . |
| 4,655,570 | 4/1987 | Jafee . |
| 4,707,106 | 11/1987 | Johnson et al. . |
| 4,801,957 | 1/1989 | Vandemoere . |
| 4,816,848 | 3/1989 | Doyle . |
| 4,827,291 | 5/1989 | Guez . |
| 4,896,176 | 1/1990 | Barrett . |
| 4,994,832 | 2/1991 | Spector . |
| 5,111,224 | 5/1992 | Spector . |
| 5,142,311 | 8/1992 | Olson et al. . |
| 5,187,512 | 2/1993 | Kirkendall . |
| 5,189,467 | 2/1993 | Wheeler . |
| 5,247,320 | 9/1993 | Kay ............................... 354/120 |

FOREIGN PATENT DOCUMENTS 2231463 4/1973 Germany .

Primary Examiner—A. A. Mathews

[57] ABSTRACT

A method for pre-exposing a variety of latent images onto a filmstrip for use in a single use camera is presented wherein the latent images are in precise registration with subsequent images placed onto the filmstrip. Pre-exposed artwork is positioned to enhance a finished photograph creating a pleasing and interesting photograph without special efforts by a user. An exposure frame opening of the single use camera has a shielded portion in registration with the pre-exposed filmstrip artwork portion of the filmstrip. To place the artwork in proper registration, an imaging filmstrip is formed having an image of the artwork. The artwork image is located using an alignment filmstrip formed using the single use camera itself. The results providing for a subsequent exposure of each frame of the pre-exposed filmstrip having images in pleasing juxtaposition.

36 Claims, 4 Drawing Sheets

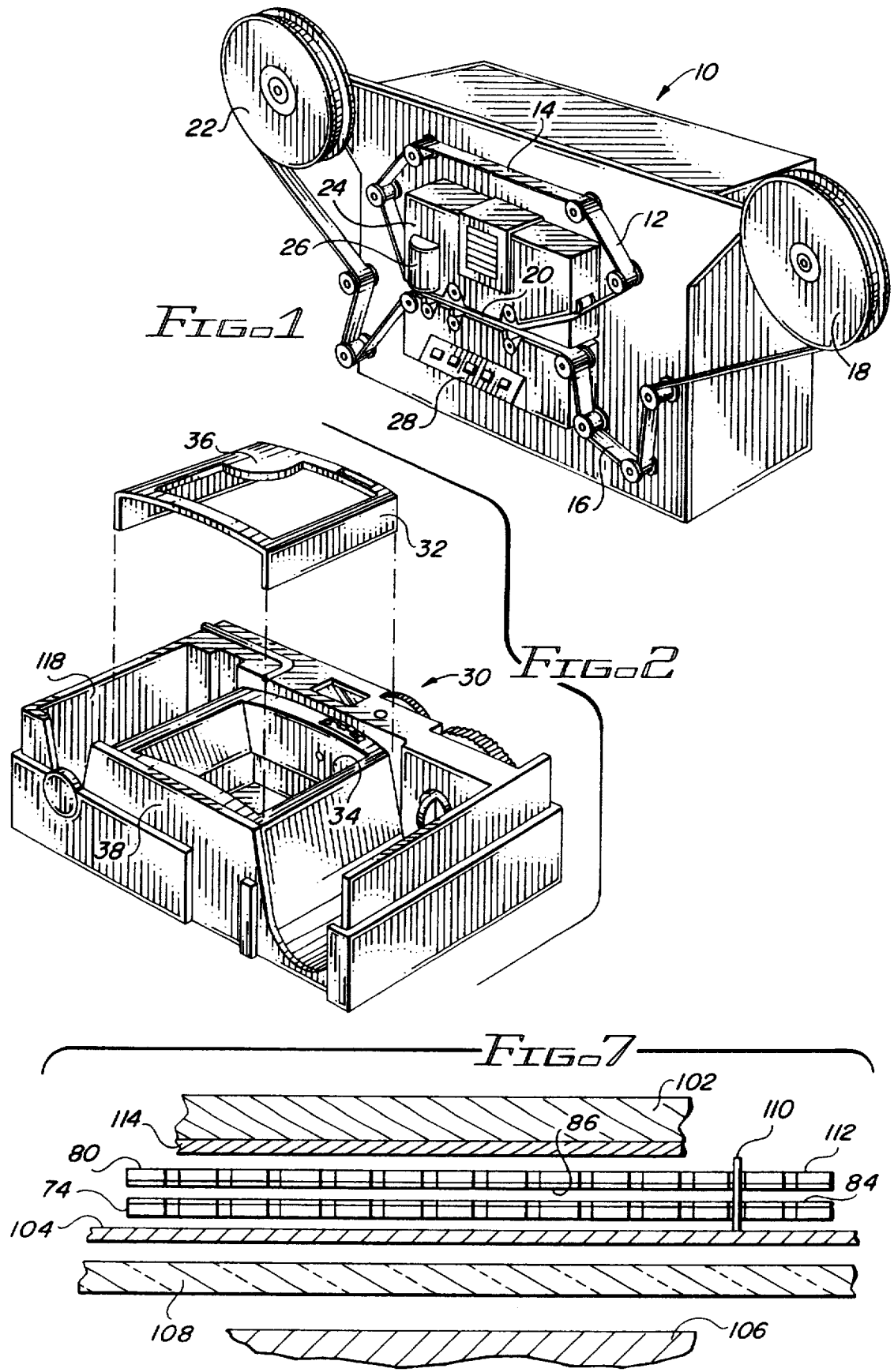

SINGLE USE CAMERA FILM PRE-EXPOSURE METHOD

BACKGROUND OF THE INVENTION

1. Field of the Invention

The invention relates to a method and devices for pre-exposing a portion of a filmstrip frame with a latent image in registration with the balance of the frame for exposure within a single use camera. In particular, the invention relates to a method for providing alignment of a latent image within the film frame and identifying the position of the latent image for placing the frame in proper registration within a single use camera.

2. Description of Background Art

Single use camera are well known in the art. They have proven particularly popular for fun photography requiring little more than an "aim and shoot" technique to create pleasing photographs. In an effort to further develop fun and excitement centered around the use of a single use camera, many techniques have been developed for pre-exposing the film loaded within the camera for placing a latent image on a film frame to create a pleasing photograph having the pre-exposed image in juxtaposition with a subject photographed by the single use camera.

U.S. Patent No. 4,310,232 issued to Richard F. Reed on Jan. 12, 1982 discloses a photographic apparatus and method for adding artificial backgrounds. Reed '232 points out that a problem well known in the art is in the alignment of the subject of the second exposure with the unexposed portion of the film frame at the second exposure.

U.S. Pat. No. 4,427,279 issued to Allen Edelstein on Jan. 24, 1984 discloses a solution to the alignment problem including simultaneous exposure of the film frame within the camera.

U.S. Pat. No. 4,655,570 issued to Hal R. Jaffe on Apr. 7, 1987 discloses a camera with a border image producing device having a photograph area and a border area extending completely about the photograph area. The camera includes a template for being placed over a frame of photographic film. An internal light source mounted within the camera exposes one section of each film frame and the camera lens and shutter expose the other section.

U.S. Pat. No. 4,707,106 issued to Bruce K. Johnson, et al. on Nov. 17, 1987 discloses masking portions of the film within a first exposure, then exchanging a mask and exposing the second or other portions.

U.S. Pat. No. 4,827,291 issued to Moshe Guez on May 2, 1989 discloses a photographic aid apparatus photographing a uniformly illuminated object. There is disclosed a method for making superimposed photographs on the same frame of a roll of negative film. Guez '291 discloses masking, exposing within the camera, rewinding the film and providing a different mask and exposing each frame a second time while preventing exposure of the pre-exposed portion of the film.

U.S. Pat. No. 5,111,224 issued to Donald Spector on May 5, 1992 discloses a camera for producing pictures of individuals jointly with characters. The camera produces a picture in which an individual whose picture is taken is seen jointly with a figurative character in such a way as to establish an apparent relationship therebetween. The camera is loaded with a dual track film having a picture track and a parallel guide track. Spector '224 discloses pre-exposing the film to capture an image. The entire film frame is exposed again wherein the first exposure comprised an under exposure and the second a full exposure.

In a camera for making collage photographs, U.S. Pat. No. 4,896,176 issued to Edwin M. Barrett discloses the use of transparency overlays in a self-developing film camera. A flash unit reflects light off of a screen producing an edged design from an overlay located within the camera.

U.S. Pat. No. 5,187,512 issued to George F. Kirkendall on Feb. 16, 1993 discloses a film cassette containing pre-exposed film. During manufacture, each frame of a filmstrip has one portion masked while the frame is exposed to light. The light impinges on a second portion of the frame to form a latent image. The filmstrip is then mounted within a camera where a previously unexposed portion of the frame is exposed to a second image bearing light, while the pre-exposed portion of the frame is masked from the second light. The strip of film is removed from the camera to develop the two latent images as a single photograph. Kirkendall '512 discloses pre-exposing a filmstrip to a single image located within a non-opaque area of a template or mask during manufacturing of the pre-exposed filmstrip.

In summary, pre-exposing a filmstrip is taught in the prior art. In particular, Kirkendall '512 discloses masking a portion of a single use camera aperture frame opening for shielding a portion of the pre-exposed filmstrip having a latent image. However, the art does not disclose a device nor teach a method for pre-exposing a filmstrip for use in a single use camera providing precise alignment between the masking portion and the latent image sufficient to result in a doubly exposed filmstrip having the latent image and subsequent image in proper registration. Prior art devices can have perceptible margin and thus unattractive margin between images.

SUMMARY OF THE INVENTION

It is an object of the invention to provide a method for proper registration of an image placed within a frame of a pre-exposed filmstrip with an image subsequently placed within the frame to be exposed using a single use camera. It is further an object to provide the registration through the use of alignment of arc desired on the pre-exposed filmstrip using the single use camera itself. It is yet another object of the invention to provide improved registration through the use of a border around the arc such that an overlay used in the single use camera to sufficiently cover the arc during subsequent exposure of the pre-exposed film. It is further an object of the invention to provide a method for pre-exposing frames within a filmstrip to varying images and the method for providing a pre-exposed filmstrip for use in a single use camera having these varying images. It is an object of the invention to provide an apparatus for pre-exposing such multiple images continuously onto a bulk roll of film for subsequent preparation for use in a single use camera.

The present invention provides a method for pre-exposing film to an image in registration with a single use camera. A copy camera is mounted in a fixed position above a surface. The surface has a black portion and a white portion. The white portion defines an area that will contain artwork to be photographed and pre-exposed as a latent image on film to be used in the single use camera. Using the copy camera, frames of an alignment filmstrip are exposed to the black and white portions of the surface. In the preferred embodiment, positive transparency film strip is used for the alignment film strip but it is anticipated that negative film will also be used. The film strip is developed and used to form an overlay having a shielded portion and an open portion. The shielded portion is representative of the artwork. The overlay is placed in a single use camera for configuring the single use camera exposure frame opening. The alignment filmstrip mounted within the single use camera and exposed to light using the single use camera. The alignment filmstrip is developed and mounted in the copy camera. A frame of the developed alignment film comprises a clear area representative of the shielded portion of the overlay and a black area representative of the open portion. Artwork is place onto the surface within the artwork portion as viewed through the alignment film clear portion through an open back copy camera. The artwork is fixed in position. An imaging filmstrip is mounted within the copy camera. In the preferred embodiment, a positive transparency filmstrip is used for positive reproduction of images. The surface having the artwork placed in the artwork portion is photographed onto the imaging filmstrip. The surface including the artwork is photographed onto a multiplicity of frames. Alternate artwork is placed within the artwork area and a pre-determined number of frames is exposed to the alternate artwork. Once developed, the imaging filmstrip has a multiplicity of frames wherein each frame has an artwork portion and a opaque or black portion. The imaging filmstrip is then placed against an unexposed filmstrip for exposing the unexposed filmstrip and placing a latent image onto the unexposed filmstrip corresponding to the artwork on the imaging filmstrip. In the preferred embodiment, negative filmstrips are used for the unexposed film strip because of the current need with single use cameras. It is anticipated that positive transparency film strip will also be used by those skilled in the art.

When the unexposed filmstrip is a length of a single predetermined roll of filmstrip, a platen for holding the filmstrip first surfaces in contact is provided and dimensioned for covering the filmstrip. The filmstrip first surfaces are held in contact between the platen and an exposure plate having a filmstrip surface dimensioned to receive the filmstrip. Exposure plate is exposed to diffuse light for illuminating the exposure plate an exposing the imaging film second surface to light for pre-exposing the unexposed filmstrip thereby placing a latent image onto the unexposed filmstrip. The latent image is representative of the imaging filmstrip artwork image. The latent image is positioned within a portion of the unexposed filmstrip for shielding by the single use camera exposure frame opening shield portion.

When the unexposed filmstrip comprises a bulk roll, the bulk roll of unexposed filmstrip is exposed to a multiplicity of frames by forming the imaging filmstrip into a continuous loop. For exposing the predetermined single roll, a reference sprocket hole is identified for aligning the pre-exposed filmstrip within the single use camera. A portion of the imaging filmstrip first surface is placed in contact with a portion of the unexposed filmstrip first surface. Filmstrips are advanced past a light source for pre-exposing the unexposed filmstrip to frames of the imaging film. The filmstrips continue to be advanced past the light source for exposing the bulk roll filmstrip to a multiplicity of imaging filmstrip images, thereby placing latent images onto the bulk roll filmstrip representative of the imaging filmstrip images forming the continuous loop. The unexposed filmstrip continues to advance thereby pre-exposing the remaining portion of the unexposed bulk filmstrip roll for providing a bulk roll of pre-exposed filmstrip having the latent images of the imaging filmstrip. The bulk roll is marked at predetermined distances from the referenced sprocket hole. Predetermined distances are representative of predetermined filmstrip lengths. The bulk roll is then cut into predetermined filmstrip lengths, each having the referenced sprocket hole. Predetermined lengths are loaded onto storage spools for placement in the single use camera. The referenced sprocket hole of the filmstrip is positioned at a leading end of the strip extending from the storage spool thereby providing for positioning a reference frame for aligning with the exposure frame of the single use camera.

By using an overlay within the single use camera itself to create the imaging filmstrip, proper registration of the artwork within a frame of the pre-exposed filmstrip is achieved. Identifying a referenced sprocket hole positions a frame within exposure frame opening of the single use camera. Providing a border around the artwork permits slight movement of the pre-exposed film within the single use camera while maintaining proper alignment of the artwork within its shielded portion. Such steps as described provide for proper registration of the latent image placed within a frame for subsequent exposure of the frame using the single use camera.

BRIEF DESCRIPTION OF THE DRAWINGS

A preferred embodiment of the invention as well as alternative embodiments are described by way of example with reference to the accompanying drawings in which:

FIG. 1 is a perspective view of a filmstrip exposure apparatus of the present invention;

FIG. 2 is a perspective partial exploded view of a single use camera and overlay;

FIG. 7 is a partial cross-sectional view of a platen and exposure plate assembly illustrating exposure of an unexposed film to an image of an imaging film;

DETAILED DESCRIPTION OF PREFERRED EMBODIMENT

Figure 3:
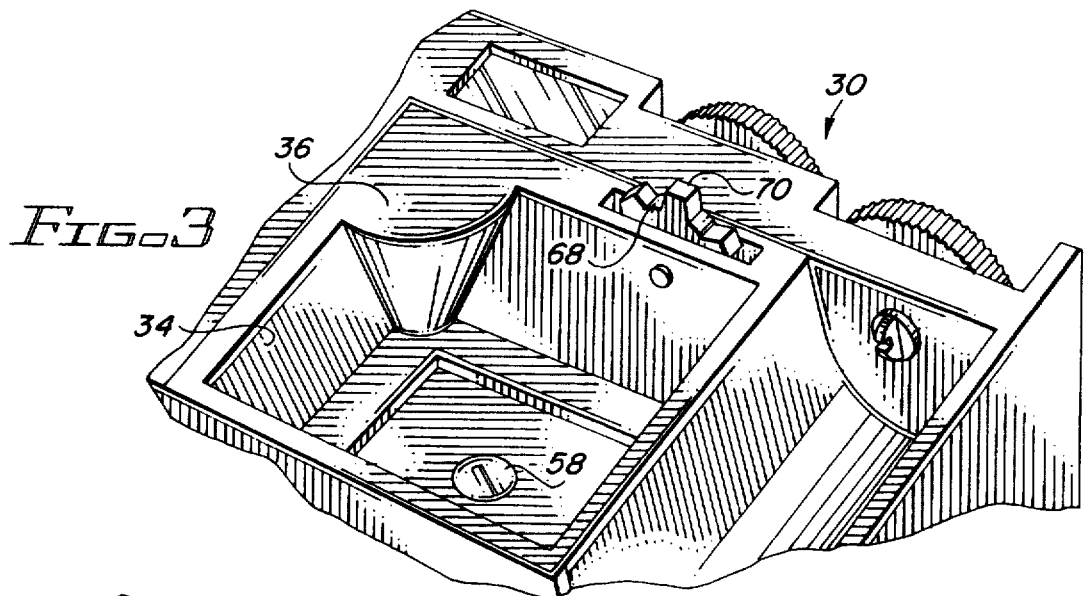
FIG. 3 is a partial perspective view of the exposure frame opening for a single use camera.

With reference to FIG. 1, the preferred embodiment of the invention uses an apparatus 10 wherein an imaging filmstrip 12 is formed into a continuous loop 14 for positioning against an unexposed filmstrip 16 for pre-exposing the unexposed filmstrip 16 with an image formed on the imaging filmstrip 12. The apparatus 10 is configured for passing unexposed film loaded on a filmstrip supply reel 18 through a slot 20 and onto a take-up reel 22. The slot 20 comprises a contact platen (not shown) and an exposure plate (not shown) between which the unexposed filmstrip 16 and imaging filmstrip 12 pass while in surfaces of the filmstrips 12 and 16 are in contact as will be further detailed later in this section. The imaging filmstrip 12 and unexposed filmstrip 16 are held in contact within the slot 20 wherein a light source (not shown) held in a lamp house holding portion 24 of the apparatus 10 causes an image on the imaging filmstrip 12 to be placed as a latent image on the unexposed filmstrip 16. In the preferred embodiment of the present invention, positive transparency film is used for the imaging filmstrip 12 and negative film for the unexposed filmstrip 16, as described earlier in this specification. As will be described later in this section, a filmstrip notch punch 26 marks the unexposed filmstrip 16 at predetermined locations for identifying a reference sprocket hole 112 as will be described later with reference to FIGS. 7, 9 and 11. The notch punch 26 is positioned proximate the lamp housing 24 for accessing the unexposed filmstrip 18 as it exits the slot 20. As will be discussed later, with reference to FIG. 9, the notch 120 provides a recognizable reference for a person loading the single use camera 30 in a dark room environment. The apparatus 10 can be programmed to expose predetermined lengths of unexposed filmstrip 16. Such programming of controls (not shown) is done through the use of a control panel 28 position on the apparatus 12 first face and accessible to an operator of the apparatus 10.

The present invention provides a method for pre-exposing the unexposed filmstrip 16 to an image positioned in proper registration with a single use camera 30. To accomplish the proper registration, the single use camera 30 having an exposure frame opening 34 is affixed with an overlay 32 positioned over the exposure frame opening 34 as illustrated in FIG. 2. The single use camera exposure frame opening 34 shields a portion 36 of a film frame passing over the opening 34. As further illustrated in FIG. 2, the shielded portion 36 is provided by the overlay 32. As illustrated in FIG. 3, the shielded portion 36 in an alternative embodiment is provided by forming the camera exposure frame opening 34 as an integral part of the single use camera body 38.

Figure 4:
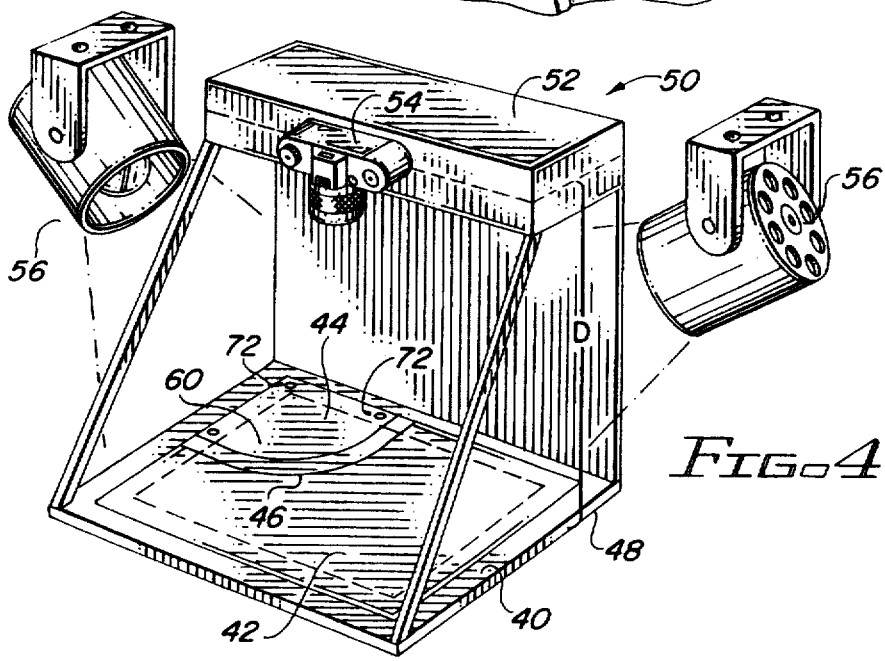
FIG. 4 is a perspective view of a copy stand made a part of the present invention.

The proper formation of the shielded portion 36 is necessary to provide proper registration of images placed within the shielded portion when used with the single use camera 30. To configure the shielded portion 36, as illustrated in FIG. 4, a surface 40 is formed to have a black portion 42 and a white portion 44. The white portion 44 identifies an artwork image area 46. In the preferred embodiment, the surface 40 is on a base 48 of a copy stand 50 as illustrated in FIG. 4.

Copy stand 50 has a support member 52 dimensioned to hold a copy camera 54 at a predetermined distance "D" from the surface 40. Imaging light sources 56 are positioned to provide imaging light onto the surface 40. In the preferred embodiment, the copy camera 54 is a Nikkon F-4 35 mm camera well-known for its precision movement. In the preferred embodiment of the present invention, 35 mm filmstrips are used in the various steps to be compatible with 35 mm film typically used in single use cameras 30. It is understood that the present invention including the methods and devices disclosed will be used with other film formats. A first or overlay filmstrip (not shown) is mounted within the copy camera 54. With imaging light from the light sources 56 impinging on the surface 40, the surface 40 having the black portion 42 and white portion 44 is photographed using the copy camera 54. The overlay filmstrip is thus exposed to the black and white portions 42 and 44 thereby forming a frame on the overlay filmstrip having a latent image of the portions 42 and 44 within the frame. The overlay filmstrip is developed. A developed frame is then used to form an overlay 32 as illustrated in FIG. 2. In the preferred embodiment of the present invention, the overlay 32 is formed using well-known photo etching methods. One embodiment of the overlay 32 comprises a brass sheet. In an alternative embodiment of the present invention, the developed overlay filmstrip frame is used to form the shielded portion 36 as an integral part of the single use camera body 38 to form the exposure frame opening 34 of the camera 30 as illustrated in FIG. 3.

As described and illustrated in FIGS. 2, 3, 9 and 10, the single use camera 30 has an exposure frame opening 34 of a predetermined configuration having a shielded portion 36 defining the artwork image area 46. Once the single use cameras 30 as illustrated in FIG. 2 and in FIG. 3 are formed, a second or alignment filmstrip is mounted within the single use camera. The alignment filmstrip is exposed to light sufficiently bright to form a latent image of the exposure frame opening 34 onto a frame of the alignment filmstrip. In the preferred embodiment of the present invention, the alignment filmstrip is exposed to bright sunlight through a lens 58 of the single use camera 30. The alignment filmstrip, positive transparency film as described earlier, is developed from a frame having an image of the exposure frame opening 34. The artwork image area 46 is black or opaque and the open area defined by the exposure frame opening 34 having received the bright sunlight developed as clear. The developed alignment filmstrip is mounted within the copy camera 54 such that the surface 40 can be viewed through an open back of the copy camera 54. By viewing the surface 40 through the developed alignment filmstrip mounted in the copy camera 54, the artwork image area is clearly defined by the opaque portion of the alignment filmstrip frame. In this way, the artwork image area 46 has now been defined in registration with the exposure frame opening 34 of the single use camera 30.

Figure 5:
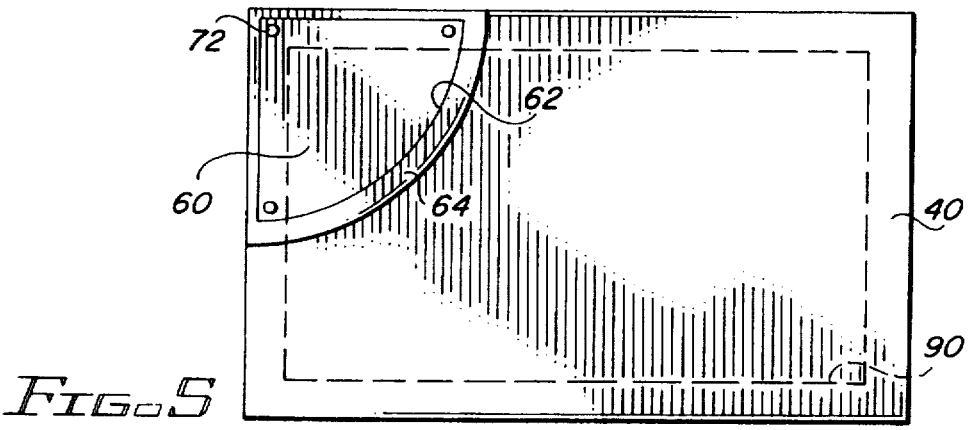
FIG. 5 is a top view of the copy stand base surface illustrating the placement of artwork onto the surface.

With reference to FIG. 5, artwork 60 having an edge portion 62 is placed within the artwork image area 46 on the surface 40. In the preferred embodiment, the artwork edge portion 62 forms a gap 64 with the artwork image area edge 62. Such a gap 64 allows for the movement of a filmstrip mounted within single use camera 30 because of movement of a sprocket gear wheel 68 because of movement tolerances of the wheel 68 or movement of the filmstrip because of differences between sprocket wheel gear tooth 70 affixed within a sprocket hole of the filmstrip not sized precisely with the sprocket wheel gear tooth 70. In the preferred embodiment, the gap 64 is approximately 3/16". Further in the preferred embodiment, the exposure frame opening 34 is sized slightly larger than the artwork area when the artwork comprises a primarily black outer portion and the exposure frame opening 34 is sized slightly smaller than the artwork when the artwork outer or perimeter portion comprises primarily a white border.

The artwork 60 is placed within the artwork image area 46. The copy camera 54 is loaded with a third or imaging filmstrip for exposing the imaging filmstrip to the artwork 60. A predetermined number of frames is exposed to the artwork 60 illuminated by imaging light source 56. As illustrated in FIGS. 4 and 5, the artwork 60 is held in position by registration pins 72. The artwork 60 is expected to be three-dimensional or two-dimensional. When the artwork is of a two-dimensional form, a rigid transparent sheet (not shown) is placed over the two-dimensional artwork for holding the artwork 60 in a fixed single plane for focusing the copy camera 54 onto that plane thereby providing a sharply defined image of the artwork 60 onto the imaging filmstrip. The artwork 60 is photographed onto a predetermined number of frames of the imaging filmstrip 12. With the preferred method of the present invention, the artwork 60 is replaced with alternative artwork (not shown) similar or varying format. The alternative artwork is held within the artwork image area 46 as described for the artwork 60. Again, a predetermined number of frames of the imaging filmstrip 12 is exposed to the alternative artwork. In the preferred embodiment, imaging filmstrip 12 uses 12, 24 and 36 exposures based on the predetermined nature of the resulting single use camera pre-exposed film planned. The imaging filmstrip 12 is developed having a multiplicity of frames wherein each frame presents the artwork 60 or alternative artwork.

Figure 6:
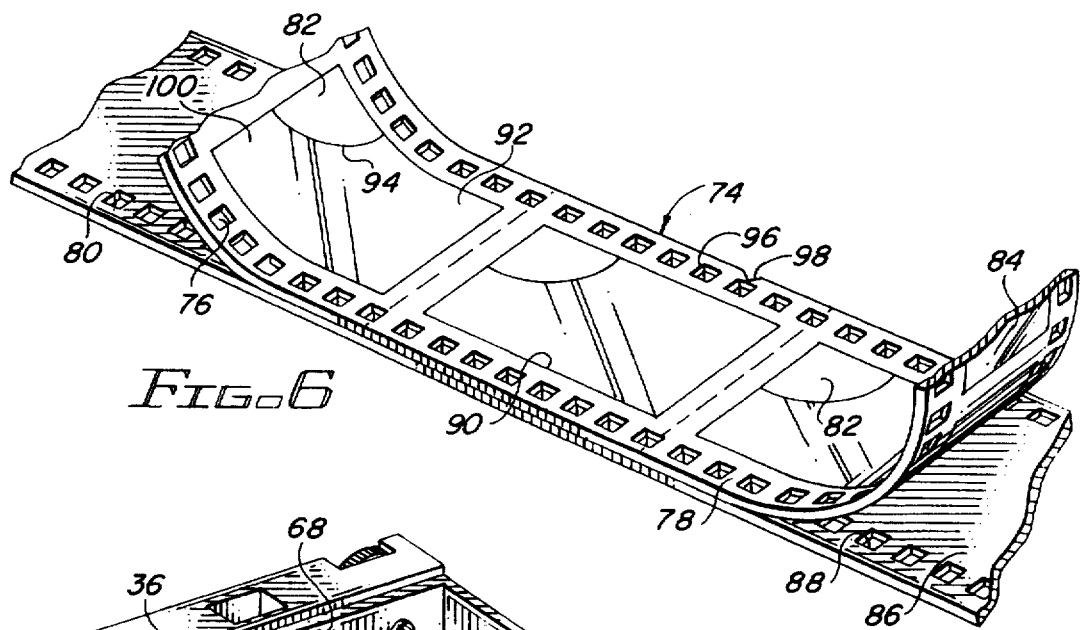
FIG. 6 is a partial perspective view of an imaging filmstrip portion in contact with a portion of an unexposed filmstrip.

As illustrated in FIG. 6, the developed imaging filmstrip 12, here referred to by numeral 74, having sprocket holes 76 along edge portions 78 of the imaging filmstrip 74 is aligned with an unexposed filmstrip 80 for the purpose of exposing the unexposed filmstrip 80 to an artwork image 82 that was placed within artwork portion of the imaging filmstrip frame as earlier described. In the preferred embodiment, an emulsion surface 84 of the imaging filmstrip 74 is placed against an emulsion surface 86 of the unexposed filmstrip 80. The sprocket holes 76 of the imaging filmstrip 74 are aligned with sprocket holes 88 of the unexposed filmstrip 80. As is understood by those skilled in the art, those steps involving the use of unexposed film is carried out within darkroom environment conditions. With further reference to FIG. 6, and as appreciated by the previous discussion, a frame portion 90 of the imaging filmstrip 74 has an opaque portion 92 corresponding to the black portion 42 of the surface as earlier described and an image portion 94 having an image of the artwork 60 representative of the artwork 60 within the artwork image area 46 as described earlier. Once the sprocket holes 88 and 76 have been aligned, a reference sprocket hole 96 is marked with a notch 98 for positioning a pre-exposed filmstrip image in registration with the exposure frame opening 34 of the single use camera 30. As further illustrated in FIG. 6, a second surface 100 of the imaging filmstrip 74 is exposed to light sufficiently bright for pre-exposing the unexposed filmstrip 80 for placing a latent image of the artwork 60 onto the unexposed filmstrip.

In one embodiment of the present invention, the unexposed filmstrip 80 is configured as a pre-determined length. By way of example, typical 35 mm filmstrip is prepared for permitting exposure of 12, 24 or 36 frames. A corresponding imaging filmstrip 74 is used to expose a single unexposed filmstrip 80 as illustrated in FIG. 7. A platen 102 is provided for holding the filmstrip first surfaces 84 and 86 in uniform contact with each other. Platen 102 is dimensioned for covering the filmstrips 74 and 80. The filmstrips 74 and 80 are placed onto an exposure plate 104 having a surface dimensioned to receive the imaging filmstrip 74. In the preferred embodiment, a light source 106 is provided in the form of an incandescent light for distributing light uniformly onto the exposure plate 104. A diffusion grid 108 is placed between the light source 106 and the exposure plate 104 for diffusing light and ensuring that a uniform exposure of the exposure plate 104 and thus the filmstrip 74 is provided. The imaging filmstrip 74 is placed onto a surface of the exposure plate 104. The unexposed filmstrip 80 is aligned with the imaging filmstrip 74 using an alignment pin 110. As described earlier, preselected sprocket hole 112 is marked by forming a notch at the sprocket hole for aligning the unexposed filmstrip 80 once pre-exposed in the single use camera for subsequent exposure. To further provide uniform contact of the filmstrip surfaces 84 and 86, a pad 114 is affixed to a surface of the exposure plate 104. As is well known in the art, such steps discussed take place in a darkroom environment.

Figure 8:
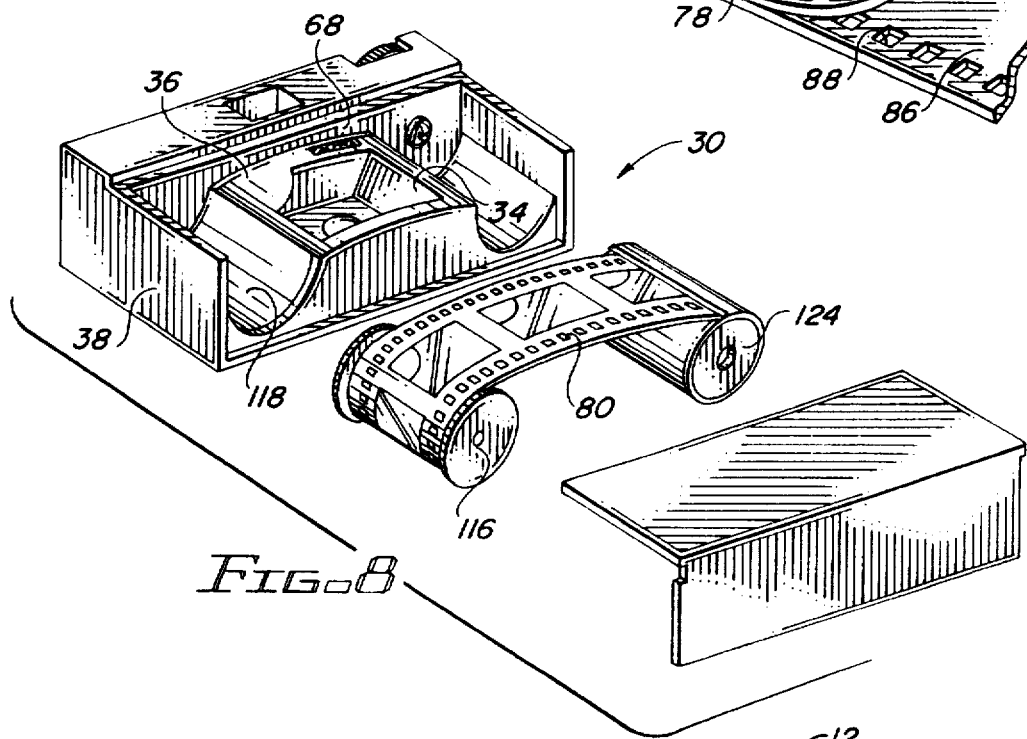
FIG. 8 is an exploded partial view of a single use camera and pre-exposed filmstrip.
Figure 9:
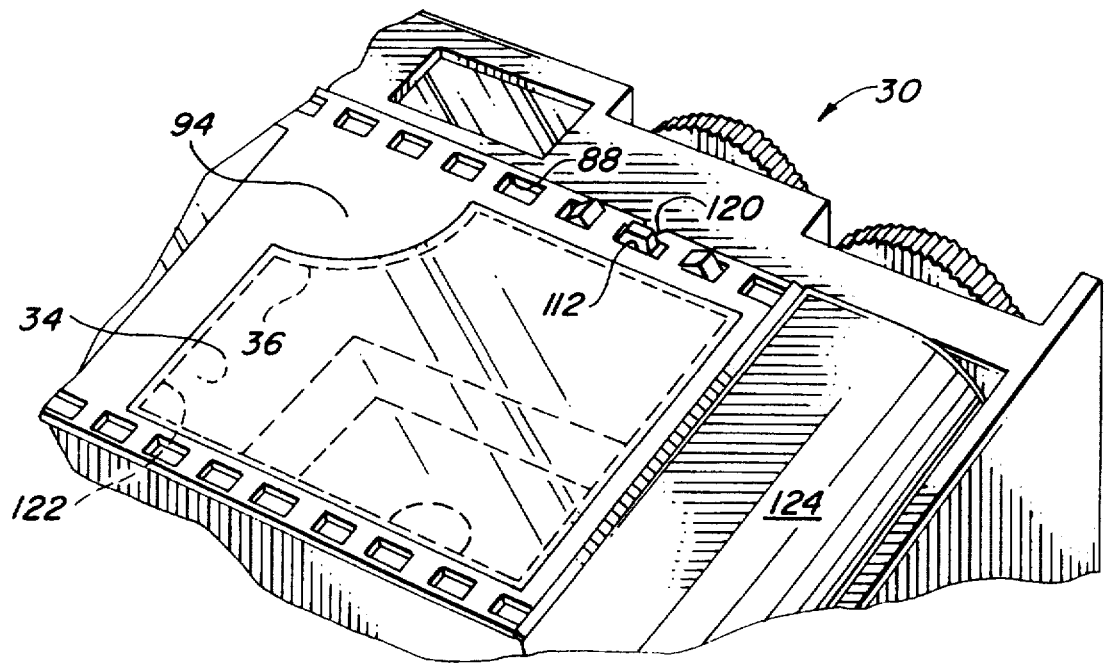
FIG. 9 is a partial perspective view of pre-exposed film mounted within a single use camera for feeding into a cassette.

With reference to FIG. 8, the now pre-exposed filmstrip 80 of a predetermined length, is loaded onto a take-up spool 116 adapted to fit within a film roll receiving cavity 118 of the single use camera 30. The leading edge of the filmstrip 80 having the preselected sprocket hole 112 with a notch 120 as illustrated in FIG. 9 is positioned within the single use camera 30 such that the artwork image portion 94 will be shielded by the shielded portion 36 and the exposure frame opening 34 is aligned with a filmstrip frame 122 of the pre-exposed filmstrip 80. As is well known with single use cameras 30, a film cassette 124 is used to take up subsequently exposed filmstrip frames 122. The filmstrip 80 is removed from the single use camera 30 and processed.

Figure 10:
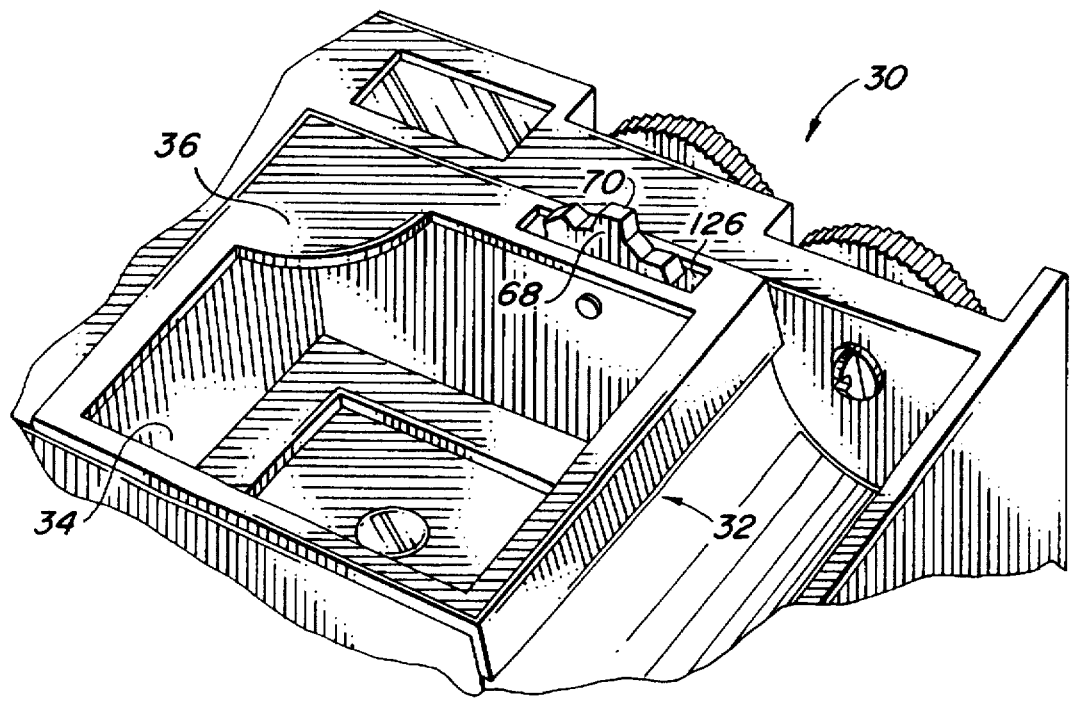
FIG. 10 is a partial perspective view of an open-back single use camera illustrating placement of an overlay.

With reference to FIG. 10, the overlay 32 has a slot 126 along a peripheral portion of the overlay 32 for permitting gear teeth 70 of a sprocket wheel 68 to extend beyond the overlay 32 and communicate with the sprocket holes 88 of the pre-exposed film 80 as illustrated in FIG. 9. With such an overlay 32, existing single use cameras 30 are adapted for use with the pre-exposed film 80. As was discussed earlier in this section, and illustrated in FIG. 3, the single use camera 30 in an alternative embodiment is configured with a shielded portion 36 integrally formed with the body of the single use camera 30.

Figure 11:
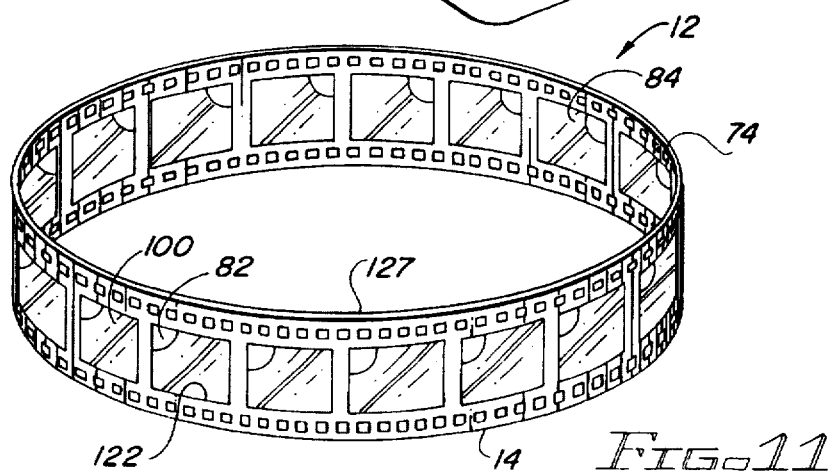
FIG. 11 is a perspective view of the imaging filmstrip formed into a loop.

As was discussed earlier with reference to FIG. 1, the preferred embodiment of the invention uses an apparatus 10 wherein the imaging filmstrip 12 is formed into the continuous loop 14. With reference to FIG. 11, the loop 14 is formed from the imaging filmstrip 12 by affixing ends of the imaging filmstrip with a splice 127. A predetermined number of frames 90 are then established for the loop 14. In the preferred embodiment of the present invention, imaging filmstrip 12 having 24 frames is used. It is anticipated that alternative numbers of frames will be incorporated by those pre-exposing film to images as described herein. As described earlier, by changing the artwork 60 illustrated in FIG. 4 and exposing a predetermined number of frames 122 to a first artwork and then exposing predetermined number of frames to a second artwork, a variety of entertaining configurations is achieved. In addition, the filmstrip exposure apparatus 10 then provides an efficient way of pre-exposing unexposed bulk filmstrip 18 for subsequent cutting into predetermined filmstrip lengths. As was described earlier, the preferred embodiment of the present invention uses 35 mm format film which as of this writing is consistent with the film used in single use cameras 30.

While specific embodiments of the invention have been described in detail hereinabove, it is to be understood that various modifications may be made from the specific details described herein without departing from the spirit and scope of the invention as set forth in the appended claims. Having now described the invention, the construction, the operation and methods of use of the preferred embodiments thereof, and the advantageous new and useful results obtained thereby, the new and useful methods and construction and reasonable equivalents thereof obvious to those skilled in the art, are set forth in the appended claims.

What is claimed is:

1. A method for pre-exposing film to an image in registration with a single use camera frame opening, the method comprising the steps of:

providing a single use camera having an exposure frame opening;

forming the opening for shielding a portion of a filmstrip frame from exposure to image bearing light, the opening providing a camera exposure film frame shielded portion sufficient for receiving an artwork image;

providing an unexposed alignment filmstrip dimensioned for use in the single use camera, the alignment filmstrip for aligning artwork within a portion of the filmstrip;

mounting the alignment filmstrip within the single use camera for exposing the filmstrip to image bearing light;

exposing the alignment filmstrip to light sufficiently bright to form a latent image of the exposure frame opening onto the alignment filmstrip;

developing the alignment filmstrip for forming a frame opening image on the alignment filmstrip wherein the developed frame has a clear portion for viewing artwork therethrough and an opaque portion;

providing artwork for exposing a first portion of a film frame to the artwork;

affixing the artwork within an artwork portion as viewed through the alignment film frame clear portion, the artwork portion corresponding to the shielded portion of the covered exposure frame;

removing the alignment filmstrip;

mounting an imaging filmstrip within the copy camera for photographing the artwork within the artwork portion, the imaging filmstrip having first and second surfaces, and sprocket holes along edge portions;

placing the artwork within the artwork portion;

exposing the imaging filmstrip to imaging light from the artwork thereby forming a frame on the imaging filmstrip having a latent image of the artwork within a portion of the frame shielded by the shield portion of the single use camera exposure frame opening;

developing the imaging filmstrip;

providing an unexposed filmstrip having first and second surfaces, the unexposed filmstrip dimensioned to communicate with the imaging filmstrip, the unexposed filmstrip having a multiplicity of sprocket holes along edge portions of the unexposed filmstrip;

placing the imaging filmstrip in contact with the unexposed filmstrip; and exposing the imaging film second surface to light for pre-exposing the unexposed filmstrip thereby placing a latent image onto the unexposed filmstrip and forming a pre-exposed filmstrip, the latent image representative of the imaging filmstrip artwork image, the latent image positioned within a portion of the unexposed filmstrip for shielding by the single use camera exposure frame opening shield portion.

2. The method as recited in claim 1, further comprising the steps of:

providing a surface dimensioned for receiving artwork;

affixing a copy camera at a predetermined distance from the surface, the copy camera having a full exposure frame opening;

viewing the surface through an open shutter of the copy camera;

mounting the alignment filmstrip having the clear portion in the copy camera; and aligning one frame of the alignment filmstrip with the copy camera exposure frame opening for viewing the surface through the clear portion of the film frame.

3. The method as recited in claim 1, wherein the imaging filmstrip placing step further comprises the steps of:

placing the imaging filmstrip first surface in contact with the unexposed filmstrip first surface;

aligning the sprocket holes of the filmstrips; and marking a reference sprocket hole for positioning a pre-exposed filmstrip latent image in registration with the exposure frame opening thereby aligning the latent image within the frame opening shielded portion.

4. The method as recited in claim 1, wherein the configuring step comprises the steps of:

advancing the imaging filmstrip for exposing predetermined frames to the artwork;

exposing the predetermined frames thereby forming an imaging filmstrip having a latent image of the artwork on a multiplicity of frames; and developing the imaging filmstrip having the multiplicity of frames, each frame having an artwork portion and a clear portion.

5. The method as recited in claim 1, wherein the forming step comprises the steps of:

providing a surface for receiving artwork;

forming a black portion on the surface, the black portion dimensioned to fill a film frame background for a camera positioned at a predetermined distance from the surface;

forming a white portion onto the surface, the white portion for identifying an artwork portion within the film frame;

loading an overlay filmstrip within a copy camera;

providing imaging light to the surface for exposing film contained within the copy camera to the imaging light;

exposing the overlay filmstrip to the black and white portions thereby forming a frame on the overlay filmstrip having a latent image of the black and white surface portions within the frame;

developing the overlay filmstrip thereby forming the latent images;

forming an overlay having an opening dimensioned to the perimeter of the black portion and an opaque portion corresponding to the clear portion for shielding the clear portion; and placing the overlay for communicating with a single use camera film frame opening thereby configuring the opening for shielding a portion of the frame from image bearing light, the shielded portion for corresponding to a portion of the frame having an artwork image.

6. The method as recited in claim 3, wherein the filmstrip first surfaces comprise filmstrip emulsion surfaces.

7. The method as recited in claim 3, wherein the marking step comprises the step of forming a notch along the unexposed filmstrip edge and placing the notch proximate the reference sprocket hole for identifying the reference sprocket hole in a darkroom environment.

8. The method as recited in claim 2, further comprising the steps of:

providing a copy stand having a base and a support member extending from the base for affixing the copy camera at a predetermined distance from the base, the base having the surface for placing artwork;

placing artwork within the artwork portion for forming a gap between a periphery of the artwork and the frame opening, thereby permitting movement of the imaging filmstrip within the single use camera whereby the shielded portion of the exposure frame opening sufficiently covers the artwork image of the imaging filmstrip.

providing registration pins for removably affixing the artwork to the base top surface;

affixing the pins to the artwork for rigidly positioning the artwork in a predetermined position thereby maintaining the artwork within the artwork portion;

providing a light source for illuminating the artwork sufficient to expose the artwork for forming an image on film, the light source affixed proximate the copy stand;

adapting the copy camera for affixing the camera to the stand support member; and affixing the copy camera to the support member at the predetermined distance from the surface.

9. The method as recited in claim 8, further comprising the steps:

replacing the artwork with alternate artwork, the alternate artwork dimensioned to fit within the frame shielded portion; and repeating the exposing and replacing steps until the predetermined multiplicity of frames have been exposed.

10. The method as recited in claim 8, wherein the artwork is a generally flat flexible sheet having an image affixed thereto, the image having a predetermined silhouette.

11. The method as recited in claim 10, further comprising the steps of:

providing a rigid transparent sheet; and placing the rigid sheet over the flat artwork for holding the artwork in a fixed single plane for focusing a camera onto the plane thereby providing a sharply defined image onto the filmstrip being exposed by the camera.

12. The method as recited in claim 1, wherein the alignment filmstrip comprises positive transparency film and the developing step thereby provides a developed alignment filmstrip forming a frame opening image having the shielded portion opaque and the opening portion clear for viewing through the clear portion.

13. The method as recited in claim 1, wherein the unexposed filmstrip further comprises a single roll length of filmstrip for exposing a predetermined number of frames and the exposing step comprises the steps of:

providing a platen for holding the filmstrip first surfaces in contact, the platen dimensioned for covering the filmstrip length;

providing an exposure plate having a filmstrip surface dimensioned to receive the filmstrip, the exposure plate having a light source surface;

providing a light source;

placing the light source for illuminating the exposure plate light source surface;

providing a diffusion grid for diffusing light from the light source;

placing the diffusion grid between the light source and the exposure plate for providing a uniform light exposure to the exposure plate light surface;

placing the imaging filmstrip second surface onto the exposure plate filmstrip surface;

placing the unexposed filmstrip first surface in contact with the imaging filmstrip first surface;

placing the platen onto the imaging filmstrip second surface for providing uniform contact of the filmstrip first surfaces; and exposing the exposure plate to diffused light.

14. The method as recited in claim 1, wherein the unexposed filmstrip further comprises a bulk roll length of unexposed filmstrip for exposing a multiplicity of frames and the exposing step comprises the steps of:

forming the imaging filmstrip into a continuous loop;

identifying a reference sprocket hole of the imaging filmstrip;

aligning the reference sprocket hole with the reference sprocket hole of the unexposed filmstrip;

placing a portion of the imaging filmstrip first surface in contact with a portion of the unexposed filmstrip first surface;

providing a light source for illuminating the imaging surface second side;

advancing the filmstrips past the light source for pre-exposing the unexposed filmstrip to frames of the imaging film;

pre-exposing a portion of the unexposed filmstrip to the imaging filmstrip artwork image;

continuing to advance the filmstrips past the light source for exposing the bulk roll filmstrip to a multiplicity of imaging filmstrip images, the pre-exposure placing latent images onto the bulk roll filmstrip representative of the imaging filmstrip images forming the continuous loop;

continuing to advance the unexposed filmstrip;

pre-exposing a remaining portion of the unexposed bulk filmstrip roll for providing a bulk roll of pre-exposed filmstrip having the latent images of the imaging filmstrip;

marking the bulk roll at predetermined distances from the reference sprocket hole, the predetermined distances representative of predetermined filmstrip lengths; and cutting the pre-exposed bulk filmstrip into predetermined filmstrip lengths each having one reference sprocket hole.

15. The method as recited in claim 14, further comprising the steps of:

providing a storage spool dimensioned for operating with a single use camera;

loading the filmstrip of predetermined lengths onto the storage spools; and positioning the reference sprocket hole of the filmstrip at a leading end of the strip extending from the storage spool, thereby providing for positioning a reference frame for aligning with the exposure frame of the single use camera.

16. A method for photographing a subject using a single use camera, the method comprising the steps of:

forming a black portion on a surface, the black portion dimensioned to fill a film frame background;

forming a white portion onto the surface, the white portion for identifying an artwork portion within the film frame;

mounting an overlay filmstrip within a copy camera;

providing imaging light to the surface for exposing film contained within a copy camera to the imaging light;

exposing the overlay filmstrip to the black and white portions thereby forming a frame having a latent image of the black and white portions of the surface within the frame;

developing the overlay filmstrip thereby forming the white latent image portion as a black image and the black latent image as a clear portion within the frame formed on the developed overlay filmstrip;

forming an overlay having an opening dimensioned to the perimeter of the black portion of the film frame and an opaque portion corresponding to the clear portion of the frame;

placing the overlay for communicating with a single use camera film frame opening thereby configuring the opening for shielding a portion of the frame from image bearing light, the shielded portion corresponding to a portion of the frame having an artwork image;

providing a pre-exposed filmstrip having a latent image affixed to a filmstrip image portion, the filmstrip having a latent image affixed to a filmstrip image portion, the filmstrip having a multiplicity of sprocket holes along edge portions of the filmstrip, the filmstrip having a reference sprocket hole for identifying a location of the latent image;

providing a single use camera;

placing the overlay within a film plane of the camera for positioning the overlay between pre-exposed filmstrip loaded into the camera and a camera lens;

loading the filmstrip into the camera;

aligning the reference sprocket hole with a reference sprocket gear tooth for positioning the filmstrip latent image for coinciding with the overlay opening thereby fully masking the latent image; and closing the camera for operation in exposing the filmstrip.

17. The method as recited in claim 16, further comprising the steps of:

placing a subject in a view finder of the single use camera for cooperating with the position of the latent image placed on the pre-exposed filmstrip; and operating the single use camera for photographing a subject.

18. The method as recited in claim 16, wherein the step of providing the pre-exposed filmstrip further includes the steps of:

providing a storage spool dimensioned for operating with a single use camera;

loading the predetermined filmstrip lengths onto the storage spools; and positioning the reference sprocket hole of the filmstrip at a leading end of the strip extending from the storage spool.

19. The method as recited in claim 16, wherein the overlay forming step comprises the step of forming the overlay from a plastic material.

20. The method as recited in claim 18, further comprising the steps of:

placing the storage spool into the single use camera, the spool received with a storage spool chamber of the camera;

providing a light tight take-up film canister;

placing the canister within a take-up chamber of the single use camera; and affixing the leading end to a take-up film canister, the filmstrip passing through the film plane over the overlay opening.

21. The method as recited in claim 17, wherein the operating step comprises the steps of:

exposing a frame of the pre-exposed film to a subject for placing the subject onto the image portion of the filmstrip juxtaposed with the latent image, the filmstrip exposed within an image portion provided by the overlay opening;

advancing the filmstrip into the take-up canister thereby positioning the filmstrip for exposing another frame;

exposing another frame;

repeating the advancing and exposure steps a multiplicity of times for exposing the filmstrip and fully loading the filmstrip into the canister;

removing the canister for preparing the exposed filmstrip for developing;

developing the filmstrip for providing an image representative of the subject juxtaposed with the image of the artwork.

22. A method for preparing a single use camera for exposing a film frame to a subject juxtaposed with a pre-exposed image within the film frame, the method comprising the steps of:

providing a developed negative imaging filmstrip having first and second surfaces, the imaging filmstrip having a multiplicity of sprocket holes along edge portions of the imaging filmstrip, the imaging filmstrip having a multiplicity of images within an image portion;

providing an unexposed negative filmstrip having first and second surfaces, the unexposed filmstrip dimensioned to communicate with the imaging filmstrip, the unexposed filmstrip having a multiplicity of sprocket holes along edge portions of the unexposed filmstrip;

placing the imaging filmstrip first surface in contact with the unexposed negative filmstrip first surface;

aligning the sprocket holes of the filmstrips;

identifying an unexposed filmstrip reference sprocket hole for positioning a pre-exposed filmstrip latent images in coincidence with imaging film images; and exposing the imaging film second surface to light for pre-exposing the unexposed negative filmstrip thereby placing a latent image onto the unexposed filmstrip thereby forming a pre-exposed negative filmstrip, the latent image representative of an image on the imaging filmstrip;

providing an overlay for masking a portion of the film image portion, the overlay having an opening dimensioned to a silhouette of the latent image;

providing a single use camera;

placing the overlay within a film plane of the camera for positioning the overlay between pre-exposed filmstrip loaded into the camera and a camera lens;

loading the pre-exposed filmstrip into the camera;

aligning the reference sprocket hole with a reference sprocket gear tooth for positioning the filmstrip latent image for coinciding with the overlay opening thereby fully masking the latent image; and closing the camera for providing a light tight operating environment for the pre-exposed negative filmstrip.

23. The method as recited in claim 22, wherein the step of providing the overlay comprises the steps of:

providing a surface for receiving artwork;

forming a black portion on the surface, the black portion dimensioned to fill a film frame background;

forming a white portion onto the surface, the white portion for identifying an artwork portion within the film frame;

mounting an overlay filmstrip within a copy camera;

providing imaging light to the surface for exposing film contained within a copy camera to the imaging light;

exposing the overlay filmstrip to the black and white portions thereby forming a frame having a latent image of the black and white portions of the surface within the frame;

developing the overlay filmstrip thereby forming the white latent image portion as a black image and the black latent image as a clear portion within the frame formed on the developed overlay filmstrip;

forming the overlay having an opening dimensioned to the perimeter of the black portion of the film frame and an opaque portion corresponding to the clear portion of the frame; and placing the overlay for communicating with a single use camera film frame opening thereby configuring the opening for shielding a portion of the frame from image bearing light, the shielded portion for corresponding to a portion of the frame having an artwork image.

24. The method as recited in claim 22, wherein the filmstrip first surfaces comprises filmstrip emulsion surfaces.

25. The method as recited in claim 22, wherein the step of providing the developed negative imaging filmstrip comprises the steps of:

providing a copy stand having a base and a support member extending from the base for affixing a camera, the base having a top surface for placing artwork;

placing artwork having a predetermined silhouette onto the base top surface;

providing registration pins for removably affixing the artwork to the base top surface;

affixing the pins to the artwork for rigidly positioning the artwork in a predetermined position;

illuminating the artwork;

providing a copy camera adapted to be affixed to the copy stand support member;

loading an unexposed filmstrip into the copy camera for exposing frames of the film to the artwork;

affixing the copy camera to the support member at a predetermined distance from the base top surface;

fully exposing a frame of the film to the illuminated artwork;

repeating the exposing step until a predetermined multiplicity of frames have been exposed;

removing the film from the camera for developing the filmstrip; and developing the negative filmstrip thereby forming the imaging filmstrip having a multiplicity of images.

26. The method as recited in claim 25, further comprising the step of covering the top service with a black velvet material for providing a background for artwork placed onto the top surface.

27. The method as recited in claim 25, wherein the artwork is a generally flat flexible sheet having an image affixed thereto.

28. The method as recited in claim 27, further comprising the steps of:

providing a rigid transparent sheet; and placing the rigid transparent sheet over the artwork for holding the artwork in a fixed single plane for focusing a camera onto the plane thereby providing a sharply defined image onto the filmstrip being exposed by the camera.

29. The method as recited in claim 25, wherein the filmstrip is of the 35 mm type for use in communicating with a 35 mm negative type filmstrip being pre-exposed for use in a single use camera.

30. The method as recited in claim 25, further comprising the steps of:

replacing the artwork with alternative artwork for exposing additional frames of the filmstrip, the alternative artwork having a silhouette dimensioned to the artwork silhouette;

affixing the alternative artwork at the predetermined position;

exposing an additional frame to the alternative artwork;

repeating the exposing steps until a predetermined number of frames is fully pre-exposed.

31. The method as recited in claim 25, wherein the unexposed filmstrip further comprises a single roll length of filmstrip for exposing a predetermined number of frames and the exposing step comprises the steps of:

providing a platen for removably affixing the filmstrips in parallel planes, the platen dimensioned for covering the filmstrip length;

providing an exposure plate having a filmstrip surface dimensioned to receive the filmstrip, the exposure plate having a light source surface;

providing a light source;

placing the light source for illuminating the exposure plate light source surface;

providing a diffusion grid for diffusing light from the light source;

placing the diffusion grid between the light source and the exposure plate for providing a uniform light exposure to the exposure plate light surface;

placing the imaging filmstrip second surface onto the exposure plate filmstrip surface;

placing the unexposed filmstrip first surface in contact with the imaging filmstrip first surface;

placing the platen onto the imaging filmstrip second surface for providing uniform contact of the filmstrip first surfaces; and exposing the exposure plate to diffused light.

32. The method as recited in claim 25, wherein the unexposed filmstrip further comprises a bulk roll length of unexposed filmstrip for exposing a multiplicity of frames and the exposing step comprises the steps of:

forming the imaging filmstrip into a continuous loop;

identifying a reference sprocket hole of the imaging filmstrip;

aligning the reference sprocket hole with the reference sprocket hole of the unexposed filmstrip;

placing the imaging filmstrip first surfaces in contact with the unexposed filmstrip first surface;

providing a light source for illuminating the imaging surface second side;

advancing the filmstrips past the light source for pre-exposing the unexposed filmstrip to a frame of the imaging film having an image;

pre-exposing a portion of the unexposed filmstrip;

continuing to advance the filmstrips past the light source for exposing the bulk roll filmstrip to a multiplicity of imaging filmstrip images, the pre-exposure placing latent images onto the bulk roll filmstrip representative of the imaging filmstrip images forming the continuous loop;

continuing to advance the unexposed filmstrip;

pre-exposing a remaining portion of the unexposed bulk filmstrip roll for providing a bulk roll of pre-exposed filmstrip having the latent images of the imaging filmstrip;

marking the bulk roll at predetermined distances from the reference sprocket hole, the predetermined distances representative of predetermined filmstrip lengths; and cutting the pre-exposed bulk filmstrip into predetermined filmstrip lengths having the reference sprocket holes.

33. The method as recited in claim 32, further comprising the steps of:

providing a storage spool dimensioned for operating with a single use camera;

loading the predetermined filmstrip lengths onto the storage spools; and positioning the reference sprocket hole of the filmstrip at a leading end of the strip extending from the storage spool.

34. The method as recited in claim 33, further comprising the steps of:

placing the storage spool into the single use camera, the spool received with a storage spool chamber of the camera;

providing a light tight take-up film canister;

placing the canister within a take-up chamber of the single use camera; and affixing the leading end to a take-up film canister, the filmstrip passing through the film plane over the overlay opening.

35. A method for pre-exposing film to an image in registration with a single use camera frame opening, the method comprising the steps of:

providing a single use camera having an exposure frame opening;

forming the opening for shielding a portion of a filmstrip frame from exposure to image bearing light, the opening providing a camera exposure film frame shielded portion sufficient for receiving an artwork image;

providing an unexposed alignment filmstrip dimensioned for use in the single use camera, the alignment filmstrip for aligning artwork within a portion of the filmstrip;

mounting the alignment filmstrip within the single use camera for exposing the filmstrip to image bearing light;

exposing the alignment filmstrip to light sufficiently bright to form a latent image of the exposure frame opening onto the alignment filmstrip;

developing the alignment filmstrip for forming a frame opening image on the alignment filmstrip wherein the developed frame has a clear portion for viewing artwork therethrough and an opaque portion;

providing artwork for exposing a first portion of a film frame to the artwork;

affixing the artwork within an artwork portion as viewed through the alignment film frame clear portion, the artwork portion of the surface corresponding to the shielded portion of the covered exposure frame;

removing the alignment filmstrip;

mounting an imaging filmstrip within a copy apparatus for generating artwork placed onto the surface within the artwork portion, the imaging filmstrip having first and second surfaces, and sprocket holes along edge portions;

placing the artwork within the artwork portion of the surface;

exposing the imaging filmstrip to imaging light from the artwork thereby forming a frame on the imaging filmstrip having a latent image of the artwork within a portion of the frame shielded by the shield portion of the single use camera exposure frame opening, the remaining portion having the black surface portion;

developing the imaging filmstrip;

providing an unexposed filmstrip having first and second surfaces, the unexposed filmstrip dimensioned to communicate with the imaging filmstrip, the unexposed filmstrip having a multiplicity of sprocket holes along edge portions of the unexposed filmstrip;

placing the imaging filmstrip in contact with the unexposed filmstrip; and exposing the imaging film second surface to light for pre-exposing the unexposed filmstrip thereby placing a latent image onto the unexposed filmstrip and forming a pre-exposed filmstrip, the latent image representative of the imaging filmstrip artwork image, the latent image positioned within a portion of the unexposed filmstrip for shielding by the single use camera exposure frame opening shield portion.

36. The method as recited in claim 35, wherein the copy apparatus for generating artwork comprises a copy camera for photographing the artwork.

* * * * *